United States Patent [19]

Akiyama et al.

[11] Patent Number: 5,381,293
[45] Date of Patent: Jan. 10, 1995

[54] DISK CARTRIDGE HAVING SLIDER SUPPORTED SHUTTER WITH COMPRESSABLE PROJECTIONS TO SECURE THE SHUTTER-SLIDER TO THE CARTRIDGE

[75] Inventors: Noboru Akiyama; Katsumi Kameda, both of Tokyo, Japan

[73] Assignee: Dai Nippon Insatsu Kabushiki Kaisha, Japan

[21] Appl. No.: 226,752

[22] Filed: Apr. 12, 1994

Related U.S. Application Data

[62] Division of Ser. No. 116,807, Sep. 3, 1993, Pat. No. 5,325,257.

[30] Foreign Application Priority Data

| | | | |
|---|---|---|---|
| Feb. 14, 1990 | [JP] | Japan | 2-013181[U] |
| Feb. 19, 1990 | [JP] | Japan | 2-015465[U] |
| Feb. 26, 1990 | [JP] | Japan | 2-018575[U] |
| Mar. 15, 1990 | [JP] | Japan | 2-026509[U] |
| Mar. 15, 1990 | [JP] | Japan | 2-026510[U] |
| Mar. 28, 1990 | [JP] | Japan | 2-032587[U] |
| Apr. 17, 1990 | [JP] | Japan | 2-040851[U] |
| Apr. 17, 1990 | [JP] | Japan | 2-040853[U] |
| Apr. 17, 1990 | [JP] | Japan | 2-040854[U] |
| Apr. 17, 1990 | [JP] | Japan | 2-040855[U] |
| Apr. 17, 1990 | [JP] | Japan | 2-040856[U] |
| Apr. 17, 1990 | [JP] | Japan | 2-040857[U] |
| Apr. 17, 1990 | [JP] | Japan | 2-040858[U] |
| Apr. 17, 1990 | [JP] | Japan | 2-040859[U] |
| Apr. 17, 1990 | [JP] | Japan | 2-040860[U] |
| Apr. 17, 1990 | [JP] | Japan | 2-040861[U] |

[51] Int. Cl.$^6$ .............................. G11B 23/03
[52] U.S. Cl. .............................. 360/133
[58] Field of Search .............................. 360/133; 369/291

[56] References Cited

U.S. PATENT DOCUMENTS 4,991,048 2/1991 Ikebe .............................. 360/133
5,050,030 9/1991 Nemoto .............................. 360/133

Primary Examiner—A. J. Heinz
Attorney, Agent, or Firm—Ladas & Parry

[57] ABSTRACT

A disk cartridge comprises a case with an upper and a lower shell halves united together to accommodate a disk of 3.5 inches therein, a guide portion, a shutter, and a slider slid in the guide portion of the case for supporting the shutter. The shutter is moved by a drive pin to open and close a head and spindle holes. The slider enables the shutter to move smoothly along the guide portion and prevents the shutter from being disconnected from the guide portion when the case is dropped. The slider also having grooved projections thereon which allow the projections to compress and be inserted into guide portions of the case.

9 Claims, 17 Drawing Sheets

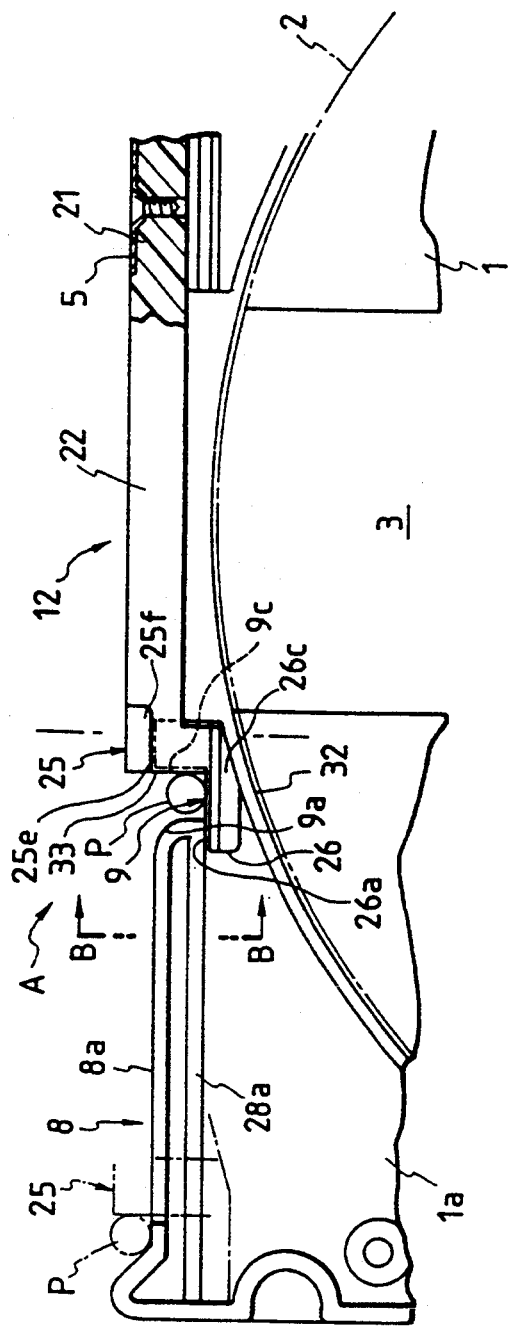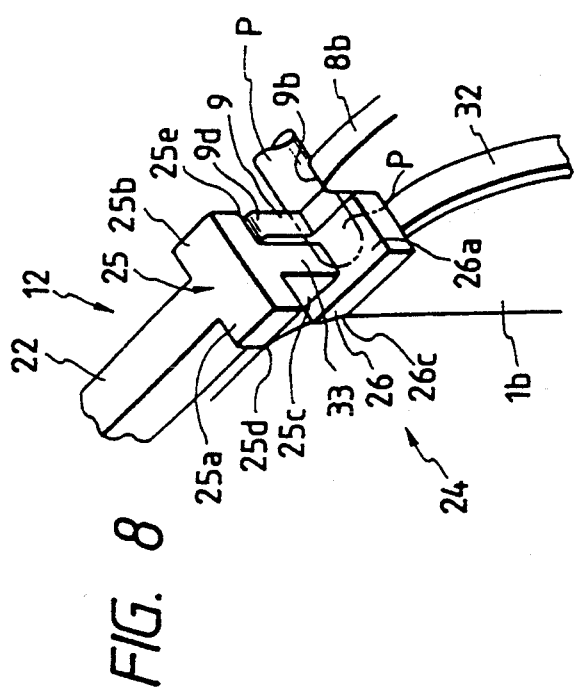
FIG. 7
FIG. 8

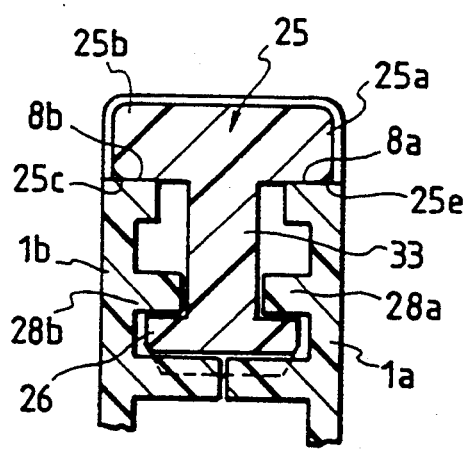
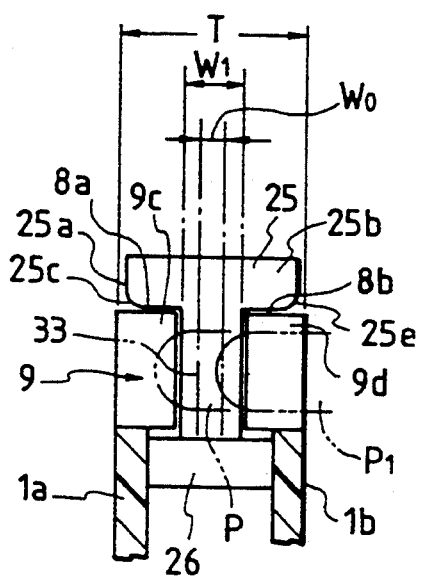
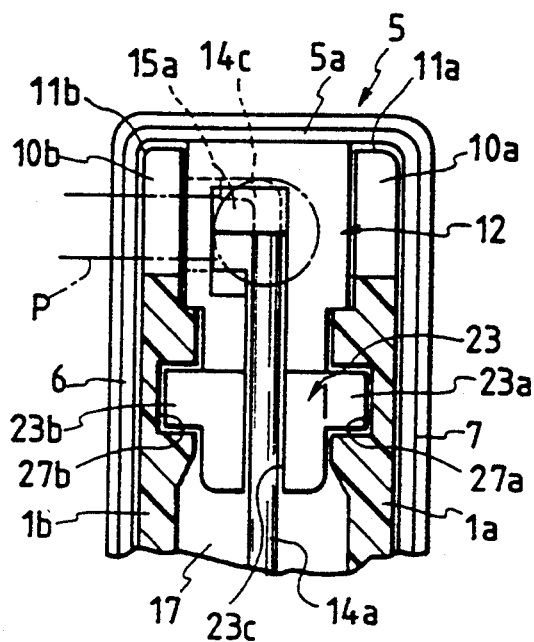

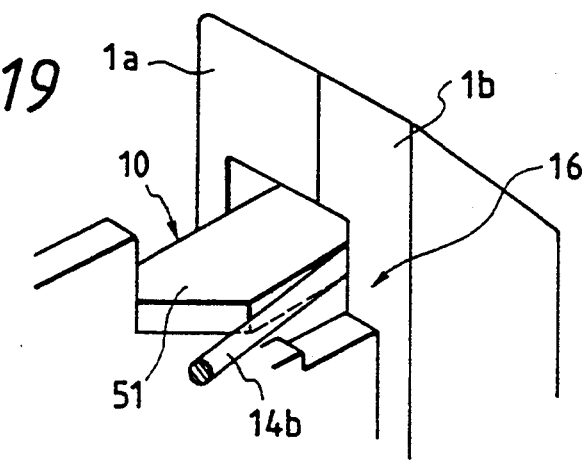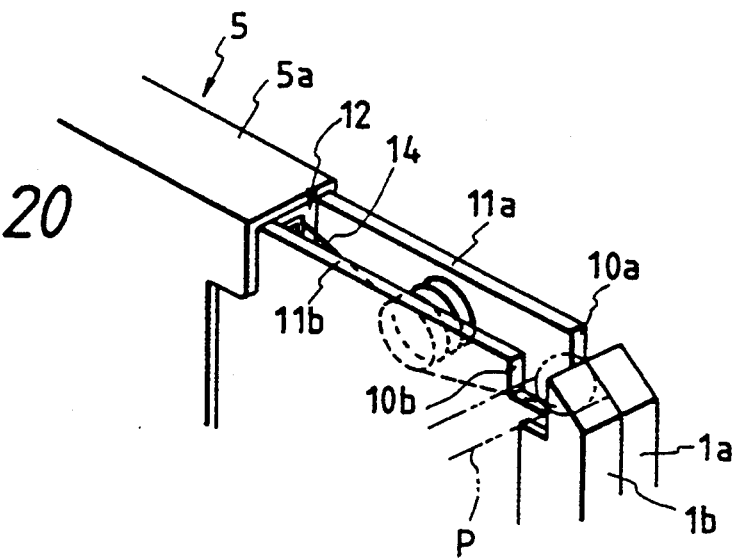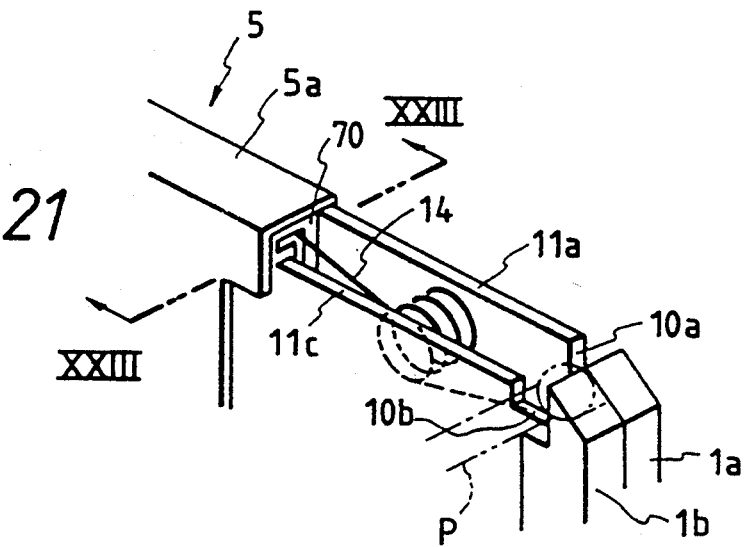

DISK CARTRIDGE HAVING SLIDER SUPPORTED SHUTTER WITH COMPRESSABLE PROJECTIONS TO SECURE THE SHUTTER-SLIDER TO THE CARTRIDGE

This is a divisional of co-pending application Ser. No. 08/116,807 filed on Sep. 3, 1993, now U.S. Pat. No. 5,325,257.

BACKGROUND OF THE INVENTION

This invention relates to a disk cartridge for accommodating a disk therein, and more particularly to a disk cartridge for accommodating a disk of 3.5 inches.

A disk-like recording medium used for a recording/reproducing apparatus is accommodated in a disk cartridge in order to prevent its breakage and attachment of dust thereon. Such a disk cartridge comprises an upper and a lower shell halves to form a case in which the disk-like recording medium, e.g., a magnetic disk, an optical disk or the like. The case is provided with a spindle hole for receiving a spindle to rotate the disk therein, and a head hole for receiving a head to read and write information. There is provided, on the case, a shutter made of metal to prevent dust or dirt from coming into the case. The shutter is urged by a twist coil spring in a direction to close the two holes provided on the case. The shutter is slidably moved by a drive pin provided in a reading/writing apparatus, that is, a player to open and close the two holes in the case.

However, in such a conventional disk cartridge, since the metallic shutter is attached directly to the case, the shutter cannot be slid smoothly on the case. Further, since a guide portion for guiding the shutter is not arranged between the shutter and the case, the shutter cannot be guided correctly in its sliding direction.

In addition, there are some problems that the engagement of the case and the twist coil spring is not made reliably, that an injection molding of the case is not made desirably, and that the shutter is disconnected from the case when the disk cartridge is dropped.

SUMMARY OF THE INVENTION

In view of these problems, it is an object of this invention to provide a disk cartridge in which a shutter provided on a case can be smoothly slid on the case.

It is another object of this invention to provide a disk cartridge whose appearance is desirable and whose case is reliably held by a predetermined position in a player.

According to one aspect of this invention, there is provided a disk cartridge having a case for accommodating a disk of 3.5 inches therein, a shutter provided slidably on the case in a bent manner for opening and closing a head hole for receiving a reading/writing head and a spindle hole for receiving a spindle for rotating the disk, and a spring member for urging the shutter in its closing direction, which comprises a slider which is provided slidably in a guide portion of the case and onto which the shutter is fixed.

According to another aspect of this invention, there is provided a disk cartridge having a combination of an upper and a lower shell halves for accommodating a disk, wherein each shell half is made by injection molding through a mold having a single injection hole.

Further objects, features and other aspects of this invention will be understood from the following detailed description of the preferred embodiments of this invention with reference to the drawings.

BRIEF DESCRIPTION OF THE DRAWINGS

FIG. 7 is an explanatory view showing a state of the guide portion when the shutter takes its opening position;

FIG. 8 is a view as viewed from an arrow A in FIG. 7;

FIG. 9 is a sectional view taken along the line IX—IX in FIG. 5;

FIG. 10 is a view as viewed from an arrow B in FIG. 7;

FIG. 11 is a sectional view taken along the line XI—XI shown in FIG. 12;

FIG. 19 is a perspective view of another spring receiving portion on the front end of the case for receiving one end of the twist coil spring;

FIG. 20 is a perspective view of the front side of the guide portion thereof;

FIG. 21 is a perspective view of the front side of the guide portion as other embodiment;

FIG. 25 is a perspective view of a plurality of locating pins provided in a player;

DETAILED DESCRIPTION OF THE INVENTION

Figure 1:
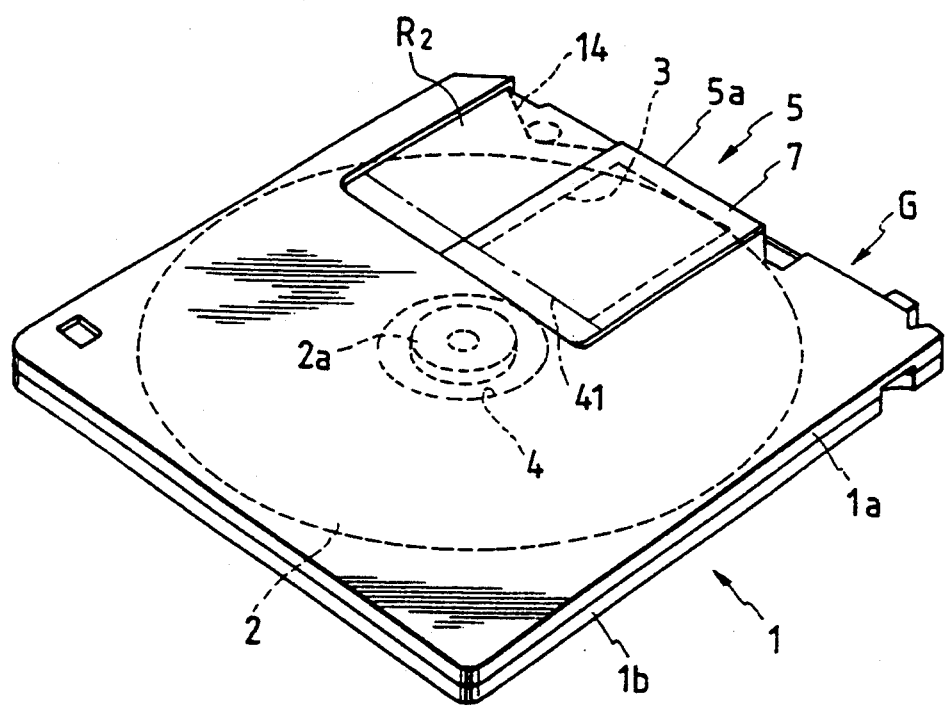
FIG. 1 is a perspective view of a disk cartridge of this invention as viewed from the side of an upper shell half.
Figure 2:
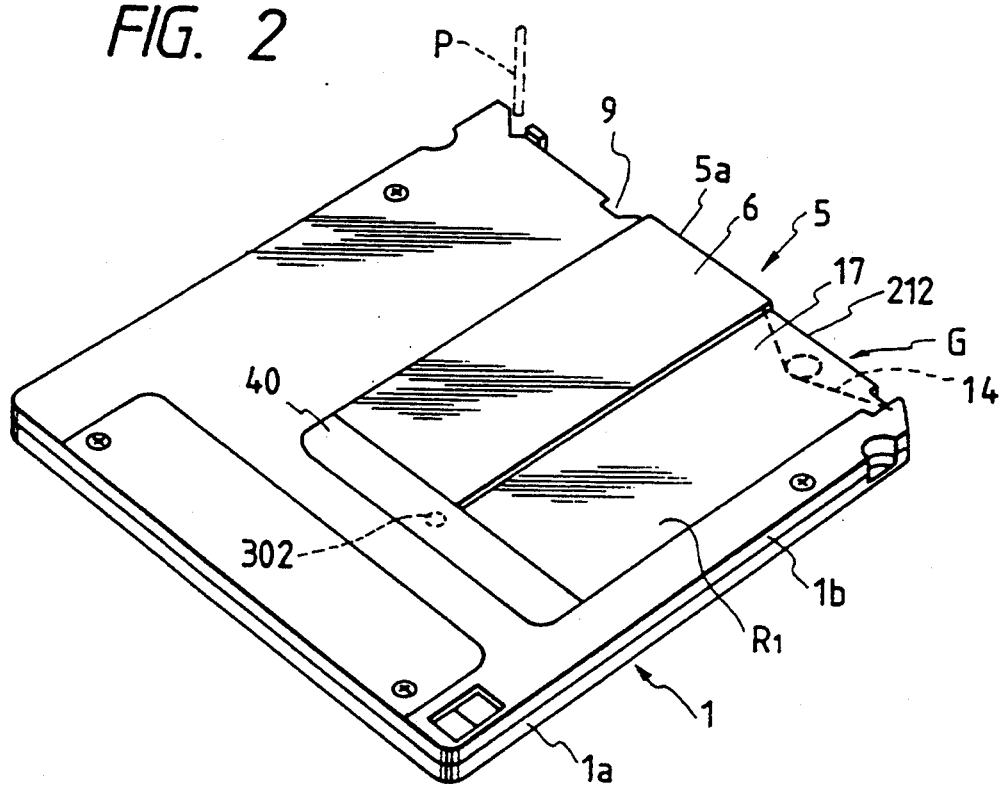
FIG. 2 is a perspective view of a disk cartridge of this invention as viewed from the side of a lower shell half.

In FIGS. 1 and 2, a reference numeral 1 shows a case of a disk cartridge made of synthetic resin, which comprises an upper and a lower shell halves 1a, 1b which have, as a whole, shallow box-like shapes, respectively.

Figure 14:
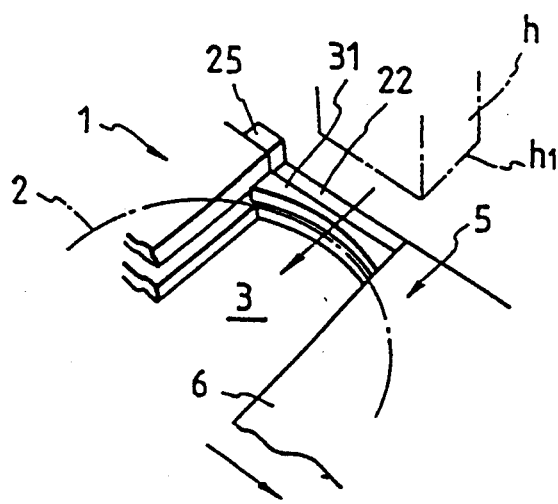
FIG. 14 is an explanatory view showing a state where a head is inserted into the cartridge with the shutter taking its opening position.

In the case 1 is accommodated, e.g. an optical disk 2 of 3.5 inches for recording optical information thereon. At the center of the lower shell half 16 is provided a spindle hole 4 for receiving a spindle (not shown) to rotate the optical disk 2 accommodated in the case 1 when the cartridge is loaded into a player (not shown), and a hub 2a fixed onto the center portion of the disk 2 is opposed to the spindle hole 4. The upper and lower shell halves 1a, 1b have head holes 3, 3 for receiving an optical head h for reading information recorded on the disk 2 and for writing information thereonto (FIGS. 3 and 14).

When reproduction is not performed, the two holes 3, 4 are closed by a shutter 5 to protect insertion of dirt or dust into the case 1. The shutter 5 is formed in such a manner that a thin metal plate such as a stainless steel plate is bent, at a center base portion 5a thereof, in the shape of a letter U to form a main closing plate 6 for opening and closing the head and spindle holes 3, 4 in the lower shell half 1b and a supplementary closing plate 7 having a length shorter than the main closing plate 6 for opening and closing the head hole 3 in the upper shell half. The main closing plate 6 of the shutter 5 and the supplementary closing plate 7 thereof can be slidably moved in a shallow recess $R_1$ formed on the lower shell half 1b and in a shallow recess $R_2$ formed on the upper shell half 1a, respectively. The distal end of the supplementary closing plate 6 is guided along a retaining plate 40 so as not to be raised therefrom. In FIG. 1, the distal end of the supplementary closing plate 7 is not guided by a retaining plate because of its short length, and, however, if necessary, a retaining plate 41 as indicated by an imaginary line may be provided.

Figure 3:
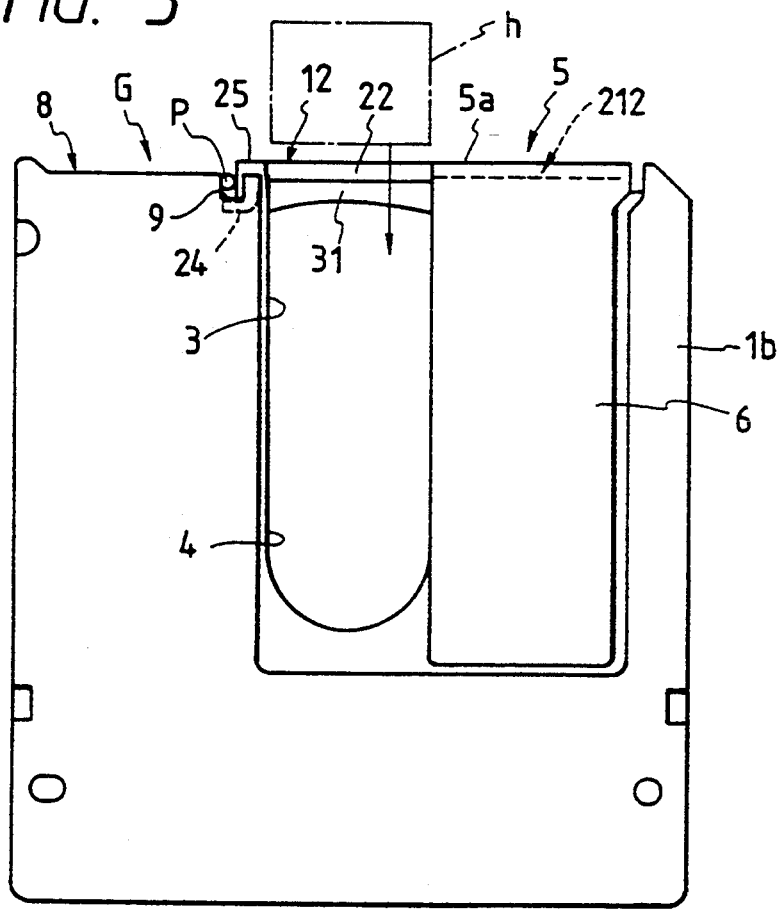
FIG. 3 is a front view of the disk cartridge when a shutter is moved to open a spindle and a head holes.

At the front end of the case 1 is formed a guide portion G for guiding the shutter 5, which has a guide surface 8 extending horizontally on the left side as viewed in FIG. 3. On the right side of the guide surface 8 is formed a dropping recess 9 into which a drive pin P provided in the player (not shown) is dropped when the shutter 5 is moved by the drive pin P to open the head and spindle holes 3, 4. The drive pin P moves the shutter 5 to the right, as viewed in FIG. 3, to open the two holes 3, 4.

A slider 12 made of synthetic resin such as polyacetal is fixed to the inner surface of the base portion 5a of the shutter 5 and slidably accommodated in the guide portion G. The right half portion of the slider 12 is fixed by a plurality of tapping screws to the inner surface of the base portion 5a thereof. The guide portion G comprises the above left guide surface 8, a right guide surface 212 and a connecting portion 31 provided between the both guide surfaces 8, 212.

Figure 4:
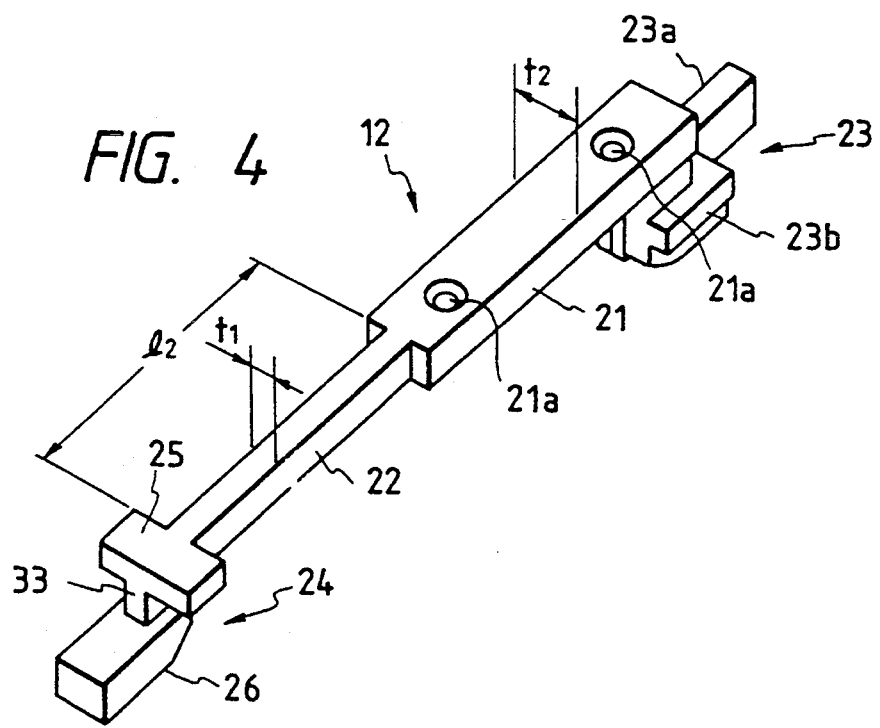
FIG. 4 is a perspective view of a slider.

The slider 12 is, as shown in FIG. 4, has a long-bar like shape and a rectangular shape in section. The slider 12 comprises a shutter support portion 21 located inside of the base portion 5a of the shutter 5 for supporting the shutter 5, and an extended portion extended from one end of the shutter support portion 21 and having a small thickness $t_1$. The thickness $t_1$ of the extended portion 22 is smaller than the thickness $t_2$ of the shutter support portion 21. The shutter support portion 21 has a first engaging projection body 23 at its right end, as viewed in FIG. 4, and the extended portion 22 has a second engaging projection body 24 at its left end. The second engaging projection body 24 comprises a sliding guide piece 25 provided at the left end of the extended portion 22 so as to be extended in the left and right directions. In this manner, the first and second engaging projection bodies 23, 24 are extended from the right end of the shutter support portion 21 and the left end of the extended portion 22 in the longitudinal direction of the slider 12, and, therefore, the two engaging portions 23, 24 of the slider 12 for engaging with the guide portion G of the case 1 are separated widely thereby to slidably guide the shutter 5 in a stable manner.

Figure 12:
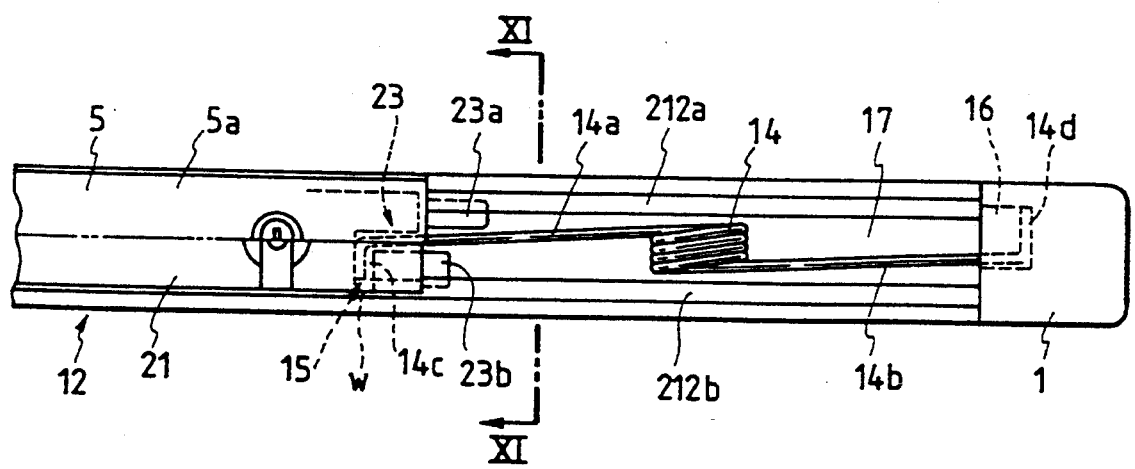
FIG. 12 is a plan view of a front end of the guide portion thereof.
Figure 13:
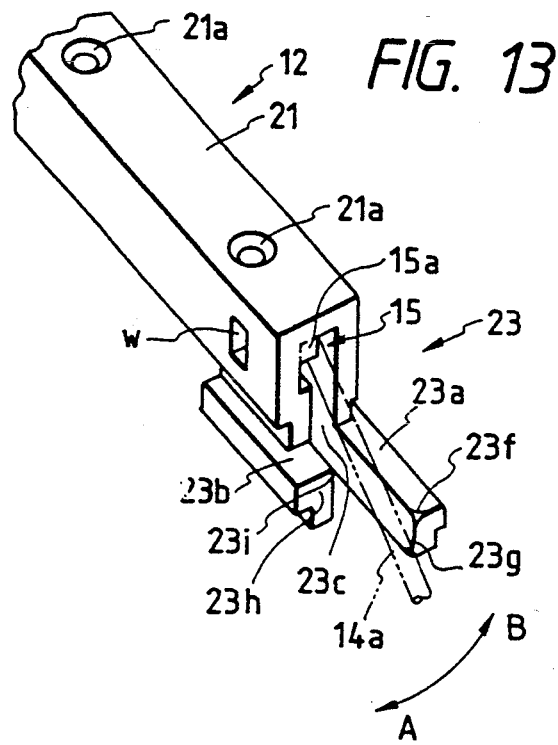
FIG. 13 is a perspective view of the front side of a slider.
Figure 18A:
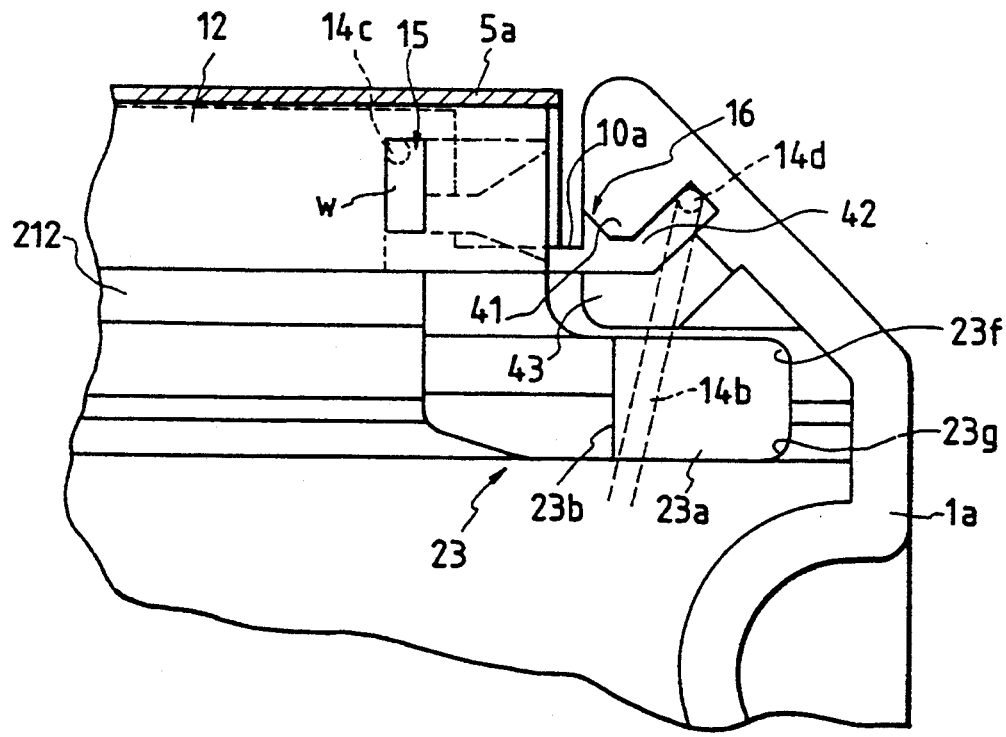
FIG. 18a is a view of the inner surface of a spring receiving portion for receiving an end of the twist coil spring.
Figure 18B:
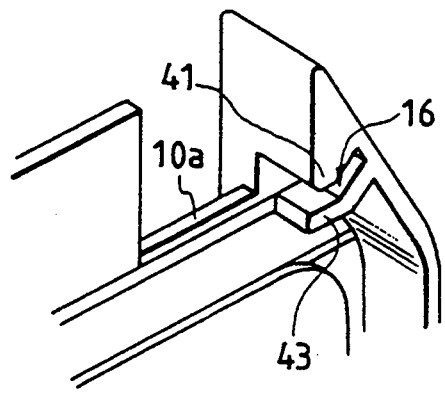
FIG. 18b is a perspective view of the spring receiving portion.

As shown in FIGS. 4, 11, 12 and 13, the first engaging projection body 23 has a pair of projections 23a, 23b on its opposite sides, which are engaged with a pair of guide grooves 27a, 27b (FIG. 11) formed on the inner walls of the upper and lower shell halves 1a, 1b in the sliding direction of the slider 12. One projection 23a is formed long while the other projection 23b is formed short. The first engaging projection body 23 has a first spring receiving portion 15 for receiving one arm 14a of a twist coil spring 14 which is accommodated in a spring accommodating space 17 (FIGS. 2 and 12). The first spring receiving portion 15 has a projection 15a for preventing the one arm 14a from coming out of the first spring receiving portion 15 (FIG. 13). The first spring receiving portion 15 has, at its one side, an opening w for receiving a bent distal end 14c of the one arm 14a as shown in FIG. 13. The bent distal end 14c thereof is inserted into the opening w thereby to protect disconnection of the one arm 14a from the first spring receiving portion 15. The case 1 has, at its upper right corner, as viewed in FIG. 18, a second spring receiving portion 16 for receiving the other arm 14b of the spring 14 which urges the slider 12 to the left as viewed in FIG. 18. As shown in FIG. 18, the first engaging projection body 23 has a dividing groove 23c into which the twist coil spring 14 is inserted.

Figure 6:
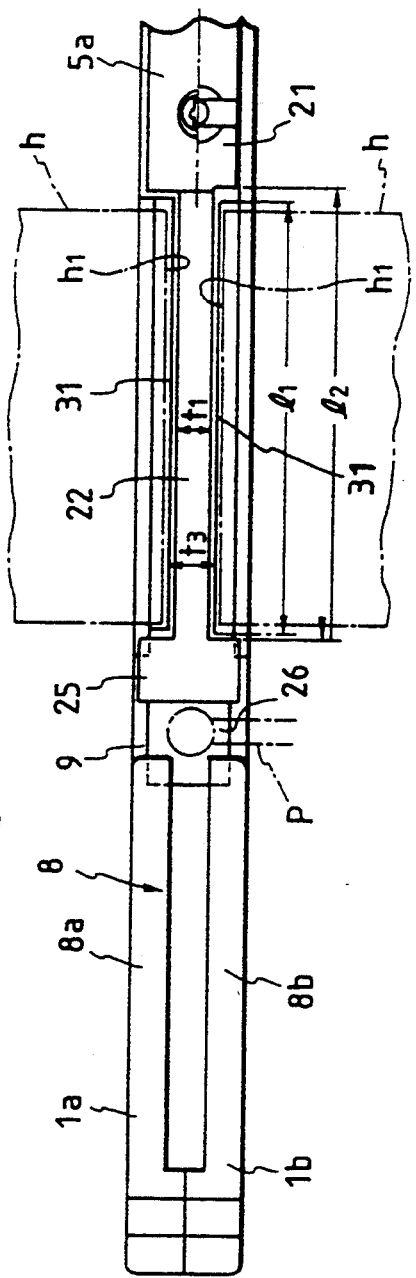
FIG. 6 is a plan view of the guide portion thereof.

In contrast, the extended portion 22 of the slider 12 is, as shown in FIG. 6, extended from the base portion 5a of the shutter 5 to the left, as viewed in FIG. 6, to abut against the drive pin P. The drive pin P abuts against the distal end of the extended portion 22 to push it in the right direction when the shutter 5 is moved to open the two head and spindle holes 3, 4. Therefore, any other specific portion for engaging the drive pin P is not necessary because the extended portion 22 of the slider 12 functions as an engaging portion for engaging the drive pin P. This simplifies the structure of a portion of the shutter 5 which is fixed onto the slider 12 thereby to make its outer shape small. Further, the reason why the thickness $t_1$ of the extended portion 22 is small is because the extended portion 22 does not obstruct the approach of the head h toward the head hole 3 when the head h is inserted thereinto. That is, the head h is, as shown in FIG. 14, moved toward the head hole 3 from the side of the guide portion G. The lower face $h_1$ of the head h is located, at its height position, close to the surface of the disk 2 accommodated in the case 1. The connecting portion 31 at the front end of the case 1 is opposed to the extended portion 22 when the shutter 5 takes its opening position and cut thinly to form a thin wall with a thickness $t_3$ (FIG. 6). The thickness $t_3$ is determined so as to permit the lower face $h_1$ of the head h to pass in a recessed portion of the extended portion 22. The thickness $t_1$ of the extended portion 22 is slightly smaller than the thickness $t_3$ of the recessed portion of the connecting portion 31 and the length $l_2$ of the extended portion 22 is slightly longer than the length $l_1$ of the recessed portion of the connecting portion 31. However, the thickness $t_1$ and the length $l_2$ of the extended portion 22 may be equal to the thickness $t_3$ and the length $l_1$ of the recess forming part of the connecting portion 31, respectively.

The sliding guide piece 25 of the second engaging projection body 24, formed at the distal end of the extended portion 22 of the slider 12 slides on the guide surface 8. The extended portion 22 has, at its left end, a guide foot 26 formed integratedly with the distal end of the extended portion 22. The guide foot 26 engages with a pair of guide rails 28a, 28b to guide the slider 12 in its sliding direction and to prevent the slider 12 from being disconnected from the guide portion G of the case 1.

The sliding guide piece 25 has, at its end, a pair of wings 25a, 25b projecting in its lateral direction, whose lower surfaces slidably contact the guide surfaces 8a, 8b. The wings 25a, 25b have chamfered smoothly curved corners 25c, 25d; 25e, 25f located separately in the sliding direction of the slider 12, respectively. The two dropping recesses 9, 9 provided on the respective guide surfaces 8a, 8b have also chamfered corners 9a, 9b, 9c, 9d at their respective opposite sides (FIGS. 7 and 8).

The second engaging projection body 24 has an upper surface which is located at a position lower than the bottom walls of the dropping recesses 9 when the shutter 5 is moved to open the head and spindle holes 3, 4. The guide foot 26 has, at its rear end, an inclined surface 26c which is opposed to the outer surface of a surrounding wall 32 for holding the periphery of the disk 2 when the shutter 5 takes its complete opening position.

When the shutter 5 is moved to open the holes 3, 4 of the case 1, the drive pin P is, as shown in FIG. 7, engaged with the front end of the sliding guide piece 25 of the slider 12 to push the slider 12 to the right so that the slider 12 is slidingly moved on the guide surfaces 8a, 8b. At this time, the slider 12 is slidingly moved in a state wherein the sliding guide piece 25 and the first engaging projection body 23 are guided by guide rails 8a, 8b; 28a, 28b (FIG. 9) thereby to move the shutter 5 to the right to open the head and spindle holes 3, 4. When the shutter 5 takes its complete opening position, the drive pin P drops into the dropping recess 9 to maintain the shutter 5 at its opening position. If the upper surface 26a of the guide foot 26 is located more highly than the bottom wall of the dropping recess 9, the dropping pin P abuts against the upper surface 26a of the guide foot 26 to be prevented from dropping completely into the dropping recess 9. As a result, the drive pin P is not reliably held by the dropping recess 9 to be pushed out of the dropping recess 9 by the slider 12 urged by the twist coil spring 14. However, in this embodiment, since the upper surface 26a of the guide foot 26 is located at a position lower than the bottom wall of the dropping recess 9 as shown in FIGS. 7 and 8, the drive pin P can be reliably dropped into the dropping recess 9.

Further, since the guide foot 26 has the inclined surface 26c at its lower face, the guide foot 26 does not contact the surrounding wall 32 when the shutter 5 takes its complete opening position.

When the slider 12 is slid on the guide surfaces 8a, 8b to open the two holes 3, 4, the wings 25a, 25b pass over the dropping recesses 9, 9 in the extending direction of the guide surfaces 8a, 8b. At this time, if there is an error in manufacture of the second engaging projection body 24 and the guide surfaces 8a, 8b, etc., the corners 25d, 25f may be caught by the corners 9c, 9d of the walls of the dropping recesses 9, 9. However, since the corners 25d, 25f of the wings 25a, 25b and the corners 9c, 9d of the dropping recesses are chamfered with each other, the wings 25a, 25b can be smoothly passed over the dropping recesses 9, so that the shutter 5 can be smoothly moved to the limit to open the holes 3, 4 completely.

In contrast, when the two holes 3, 4 are opened, the drive pin P is removed upwardly from the dropping recesses 9 to return the slider 12 to an original position under a spring force of the twist coil spring 14 (FIGS. 7 and 8). Also, at this time, since the corners 25c, 25e of the wings 25a, 25b and the corners 9a, 9b of the dropping recesses 9, 9 are chamfered, the wings 25a, 25b can pass over the dropping recesses 9, 9 smoothly.

The drive pin P of the player is adapted to be projected into the case from the right to the left as viewed in FIG. 10, and, however, there may be a player whose drive pin P does not project sufficiently because of an error in its manufacture. If, in such a player, the drive pin P is stopped at a position $P_1$, a part of the drive pin P is located beneath the wing 25b. Therefore, the drive pin P may be caught by the wing 25b when it is moved upward to close the two holes 3, 4. In this case, the corner 25e of the wing 25b is chamfered, and, therefore, the drive pin P can be moved slightly on the corner 25e without being caught by the corner 25e.

Furthermore, as shown in FIG. 10, suppose that the drive pin $P_1$ is stopped at the position $P_1$. At this time, if a arm 33 for supporting the guide foot 26 is formed so as to have a width $W_0$ smaller than the width $W_1$, there may be a case that the drive pin P does not reliably engage with the front surface of the arm 33. As a result, the slider 12 is returned to the original position under the repulsive force of the twist coil spring 14, so that the shutter closes the two holes 3, 4 by mistake. However, the arm 33 of the slider 12 is so formed as to have the width $W_1$ which is approximately equal to one third of a total width T of the case 1, and, therefore, the drive pin $P_1$ can engage reliably with the arm 33 thereby to reliably hold the shutter 5 at its opening position.

In contrast, as mentioned above, when the two holes 3, 4 are completely opened, as shown in FIG. 18, the first engaging projection body 23 may abut against the other arm 14b of the twist coil spring 14. However, the other arm 14b does not abut against the projection 23b because the projection 23b is cut away to be formed shortly. When the coil spring 14 is pushed to open the two holes 3, 4, the one arm 14a is, as shown in FIG. 13, inserted into the dividing groove 23c. However, at this time, there may be a case that the one arm 14a is caught by the inner corners 23f, 23g at the front end of the projection 23a. Since the corners 23f, 23g are chamfered, the one arm 14a does not be caught thereby. Further, two inner corners 23h, 23i of the short projection 23b are also chamfered to ensure smooth movement of the one arm 14a.

The operation or effect of the first engaging projection body 23 will now be explained in more detail.

When the slider 12 is moved slidingly to the right, the twist coil spring 14 is pushed to rotate the one arm 14a in the clockwise direction A about the bent end 14c. At this time, even if the one arm 14a happens to abut against the front corner 23f of the projection 23a, it can slide on the chamfered front corner 23f without being caught thereby to smoothly come into the dividing groove 23c. In contrast, as mentioned above, the other arm 14b does not abut against the short projection 23b as shown in FIG. 18(a).

When the shutter 5 takes a closing position, the slider 12 is slid to the left, as viewed in FIG. 12, to release the spring from its pushed state thereby to rotate the one arm 14a in the counterclockwise direction B (upwardly) about the bent end 14c. At this time, even if the one arm 14a happens to abut against the front inner corner 23g, it can slide thereon because it is chamfered to ensure a smooth rotating movement of the one arm 14a. In this manner, if the four corners 23f, 23g, 23h, 23i located at an inlet of the dividing groove 23c are chamfered, a smooth rotating movement of the one arm 14a can be ensured during movement of the shutter 5.

Figure 16:
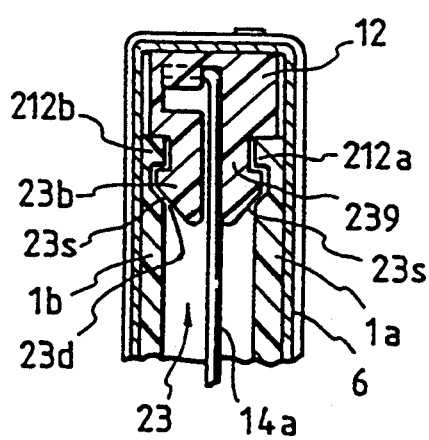
FIGS. 16 and 17 are sectional views of the front and back sides of the guide portion as other embodiment of the slider, respectively.
Figure 17:
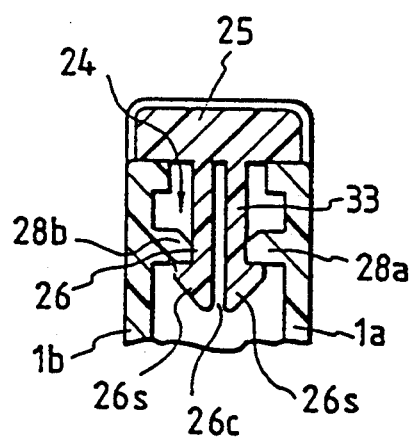

FIGS. 16 and 17 show a slider which can be easily assembled into the guide portion G of the case 1. That is, the first and second engaging projection bodies 23, 24 have two dividing grooves 23d and 26c extending through total length of each body in its longitudinal direction. The dividing groove 23d is formed so that the dividing groove 23c is extended in the longitudinal direction of the second projection body 23. The projections 23a, 23b have, at their lower faces, two inclined surfaces 23s, 23s, in cross section, respectively, while the guide foot 26 has, at its lower face, two inclined surfaces 26s, 26s in cross section. The formation of the dividing grooves 23d, 26c of the two bodies 23, 24 ensures an elastic deformation of the projections 23a, 23b of the first engaging projection body 23 and the two portions divided by the dividing groove 26c of the second engaging projection body 24 when the two bodies 23, 24 are pushed into the guide portion G while passing over the guide rails 212a, 212b, 28a, 28b. Accordingly, the first and second engaging projection bodies 23, 24 can be easily pushed into a space between the guide rails, and the lower ends of the first and second engaging projection bodies 23, 24 are caught by the lower surfaces of the guide rails to be prevented from coming out of the guide portion G of the case 1. If this slider is used, it is not necessary that the slider 12 is put between the upper and lower shell halves 1a, 1b when the case 1 is assembled. That is, the slider 12 shown in FIGS. 16 and 17 can be assembled into the guide portion G thereof only by pushing the slider 12 thereinto after the case 1 is assembled.

Figure 5:
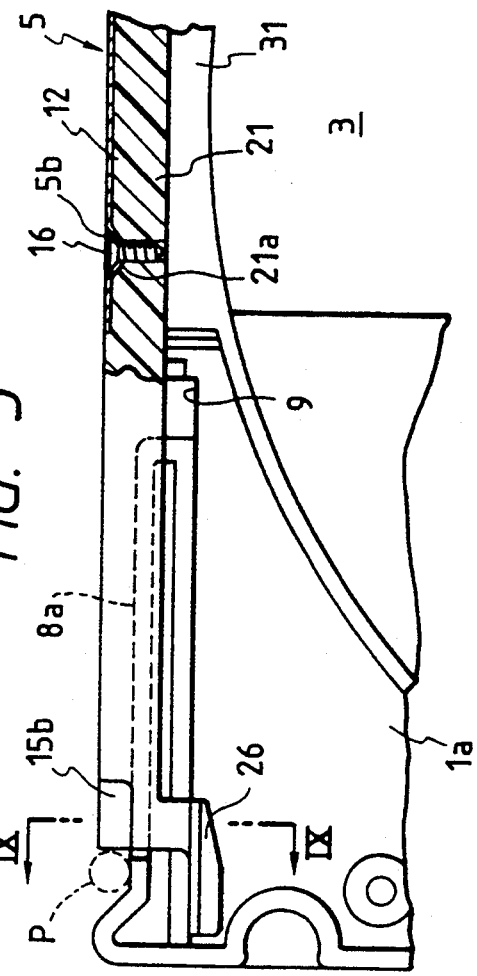
FIG. 5 is a front sectional view of a guide portion of the disk cartridge.

The shutter support portion 21 has, as shown in FIGS. 4 and 5, at its upper face, two screw holes 21a, 21a each of which has a bowl-like recess, and the base portion 5a of the shutter 5 has two bowl-like recesses 5b, 5b, corresponding to the screw holes 21a, 21a, which are formed through pierce press working. When the recesses 5b of the shutter 5 are engaged with the screw holes 21a of the slider 12, the slider 12 is reliably located to the shutter 5. Thereafter, a tapping screw 16 (connecting member) is passed through the screw hole 5a and the recess 5b to fix the shutter 5 to the slider 12. The head of the tapping screw 16 is accommodated in the bowl-like recess 5b to prevent the head from projecting upwardly. Therefore, a finger does not get injured due to touching the head of the tapping screw 16.

Figure 15:
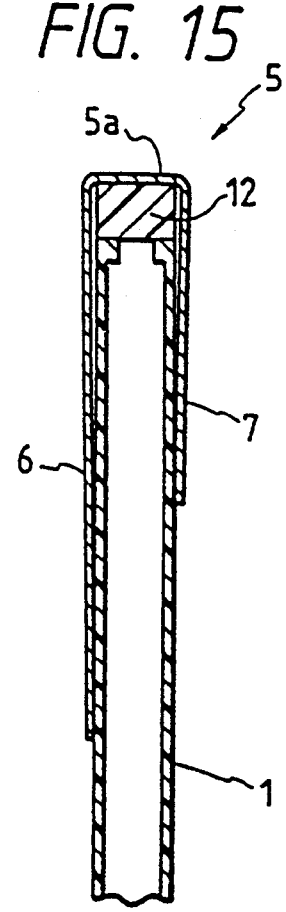
FIG. 15 is a longitudinally sectional view showing a state of engagement between the shutter and the case.

Further, as shown in FIG. 15, the main closing plate 6 of the shutter 5 and the supplementary closing plate 7 are so formed that they are urged to come close to each other. This structure prevents the shutter 5 from being removed from the case 1 and increases a sealing property of the shutter 5 with respect to the case 1.

In FIGS. 18(a) (b), on the side of the upper shell half 1a of the second spring receiving portion 16 is formed a guide hole 42 for accommodating a bent end 14d of the twist coil spring 14. The hole 42 is formed by a lower projection 41 and a guide piece 43 opposed to the lower projection 41 so as to be inclined upwardly. The other arm 14b of the twist coil spring 14 is reliably held by the second spring receiving portion 16. As shown in FIG. 19, in order to guide the other arm 14b into the second spring receiving portion 16, a guide plate 51 with an obliquely cut away portion at its front end may be extended from one end of a notch into which the drive pin P is accommodated.

When a one-side disk cartridge is inserted upside down into the player, the drive pin P is operated by mistake. In order to prevent this wrong operation, a pair of notches 10a, 10b into which the drive pin P can be inserted are, as shown in FIG. 20, formed at the guide portion G. The notches 10a, 10b are formed so as to cut away a pair of wrong operation prevention walls. A pair of wrong operation prevention walls 11a, 11b have a height much larger than the height of the drive pin P which is located in the notches 10a, 10b or have a minimum height at which the drive pin P is held.

When the disk cartridge is inserted upside down, the drive pin is inserted into the notches 10a, 10b without engaging with the front end of the second engaging projection body 24 of the slider 12. A force is exerted on the drive pin P to be moved to the left as viewed in FIG. 20. However, since each of the walls 11a, 11b has a sufficient height, the drive pin P cannot come out of the notches 10a, 10b. Therefore, the cartridge cannot be inserted into the player any more thereby to prevent breakage of the player or the cartridge.

Figure 22:
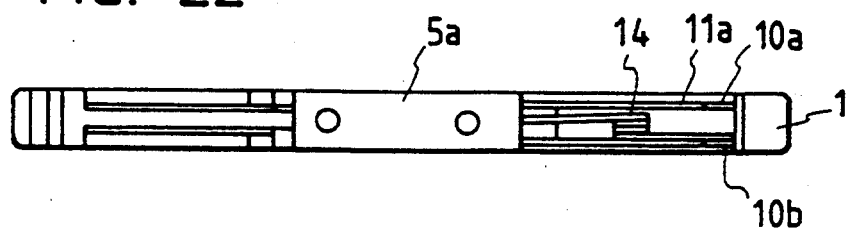
FIG. 22 is a plan view of the guide portion in FIG. 21.

In FIGS. 21 and 22, the wrong operation prevention wall 11a on the side of the upper shell half 1a has a height close to the inner surface of the base portion 5a of the shutter 5, and a wrong operation prevention wall 11c on the side of the lower shell half 1b has a height smaller than that of the wall 11a.

Figure 23:
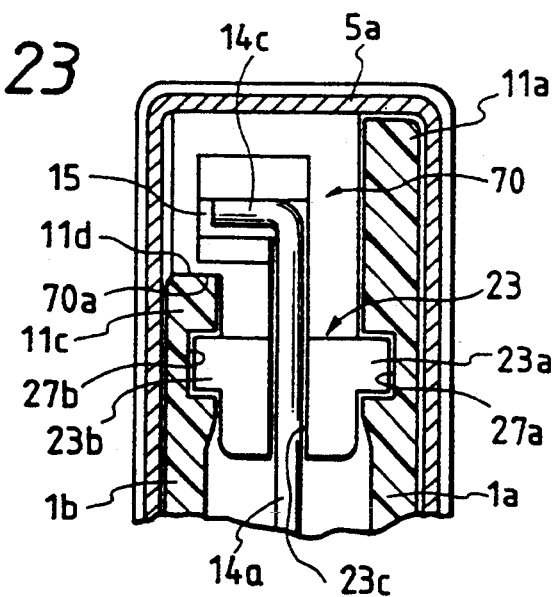
FIG. 23 is a sectional view taken along the line XXIII—XXIII shown in FIGS. 21 and 24.

In this case, the shape of a slider 70 is different from that mentioned above. That is, one side face of the slider 70 faces, as shown in FIG. 23, the inner surface of the wall 11a, a portion of the slider 70 rides slidably on the wall 11c to form two sliding surfaces 11d, 70a. The slider 70 and the walls 11a, 11c are made of synthetic resin such as polycarbonate, polyacetal, etc., and the two sliding surfaces 11d, 70d have a slippery property, respectively. In this manner, the side face of the slider 12 is projected over the wall 11c to form a sufficient portion for receiving the bent end 14c for the spring 14. This structure can prevent the bent end 14c from coming out of the first spring receiving portion 15.

The side face of the slider 12 has a projected guide rail with the inner surface of the guide portion G having a groove for engaging the guide rail as shown in the above embodiments. In contrast, the inner surface of the guide portion G may have a guide rail with the slider 12 having a groove for engaging the guide rail.

Figure 24:
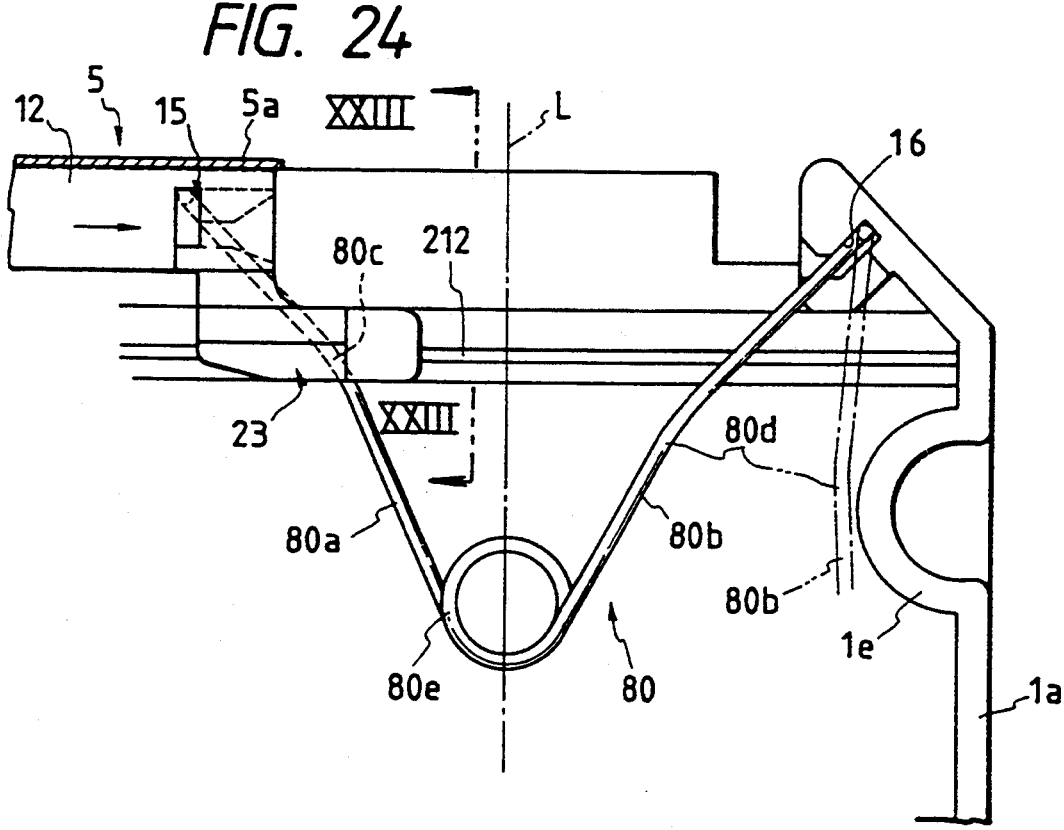
FIG. 24 is a front view of a twist coil spring provided at an inner corner of an upper shell half, showing other embodiment of the twist coil spring.

As shown in FIG. 24, a twist coil spring 80 has a pair of arms 80a, 80b which are bent inwardly (in a direction of the center line L) to each other and have two bent points 80c, 80d, respectively. Further, the spring 80 has a coil portion 80e between two arms 80a, 80b.

When the shutter 5 is moved to the right as shown in FIG. 24, the twist coil spring 80 is pushed inwardly and the two arms 80a, 80b are moved to the right side face of the case. At the side face of the case is provided a drawing recess 1e with which a drawing member provided in the player is engaged to draw the case into the player when the disk cartridge is loaded in the player. At this time, the arm 80b does not abut against the inner wall of the drawing recess 1e projected inwardly because it is bent inwardly thereby to prevent the arm 80b from coming out of the second engaging portion 16.

In addition, if the two arms 80a, 80b are bent inwardly to each other, a stress exerted on the spring when the spring 80 is pushed inwardly is dispersed on the two bent points 80c, 80d without being concentrated only on a single portion of the coil portion 80e. However, since a conventional spring has two straight arms, a stress is concentrated only on its coil portion. Therefore, since, in this embodiment, it can be effectively avoided that a stress is concentrated only on a single portion of the coil portion 80e, the coil portion 80e can have a long life span.

Engagement between the slider 12 and the base portion 5a of the shutter 5 may be as follows.

Figure 25:
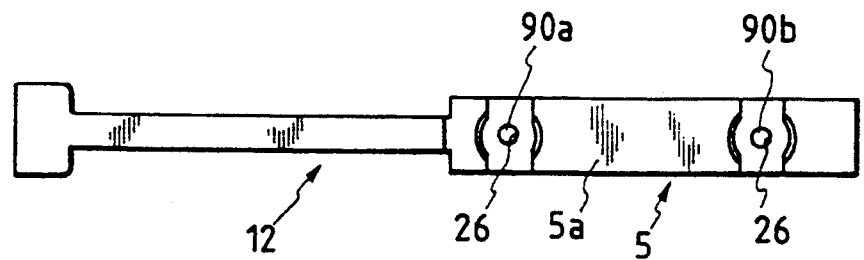
FIG. 25 is a plan view of a slider with a shutter.
Figure 26:
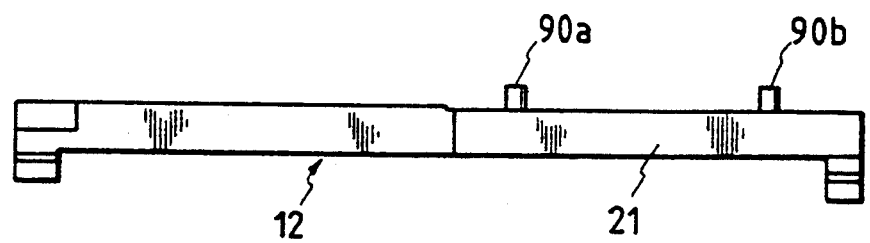
FIG. 26 is a side view of the slider.
Figure 27:
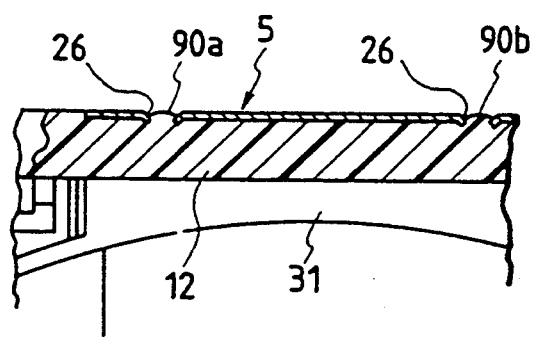
FIG. 27 is a longitudinal view of the slider, showing an engagement between the shutter and the slider.

The slider 12 has, on the support portion 21, two projections 90a, 90b which are engaged with two recessed holes 26, 26 formed in the base portion 5a of the shutter 5 (FIGS. 25 to 27). After engagement of the holes 26, 26 and the projections 90a, 90b is made, the projections 90a, 90b projected upwardly are caulked by a caulking chisel to fix the shutter 5 onto the slider 12. The caulked head is not projected outwardly over the surface of the base portion 5a because it is accommodated in the recessed hole 26.

Figure 28:
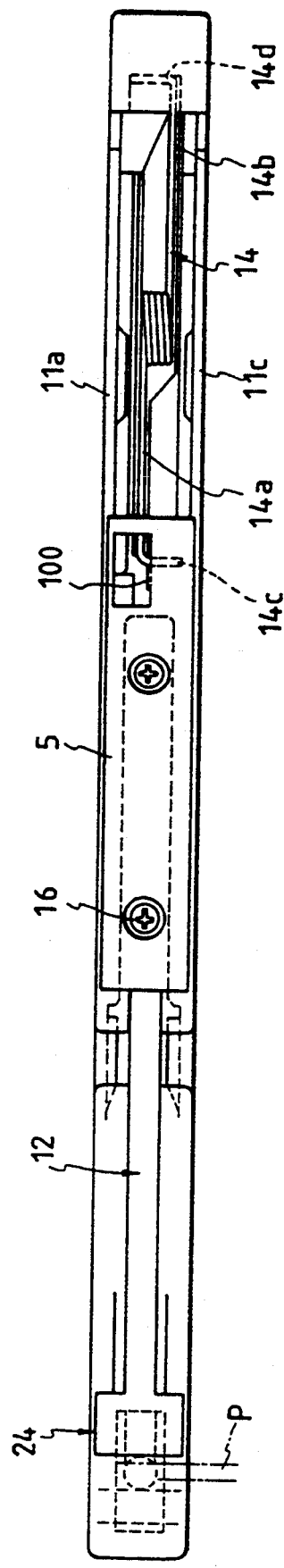
FIG. 28 is a plan view showing other embodiment of the guide portion.
Figure 29:
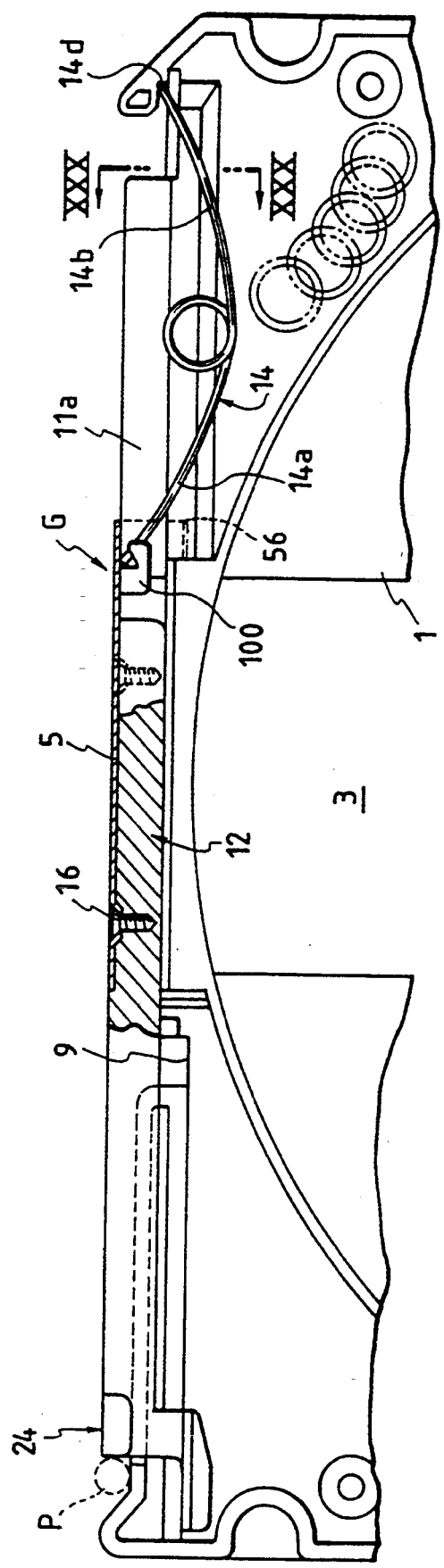
FIG. 29 is a longitudinal view of the guide portion in FIG. 28.
Figure 30:
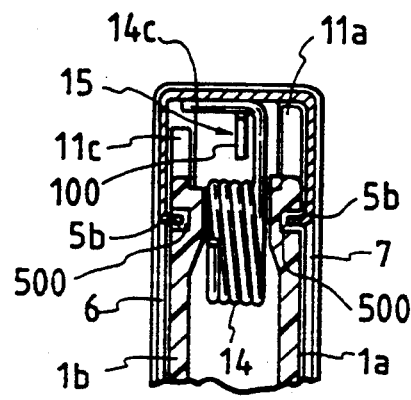
FIG. 30 is a sectional view taken a long the line XXX—XXX shown in FIG. 29.

In the above embodiment, the one arm 14a of the twist coil spring 14 is engaged with one end of the slider 12. However, as shown in FIGS. 28 to 30, a base portion 5a of the shutter 5 is extended forwardly to form a spring receiving portion 100 for receiving the one arm 14a of the twist coil spring 14. In this case, the bent end 14c of the twist coil spring 14 must be positioned over the upper surface of the wrong operation prevention wall 11c, and, therefore, the wrong operation prevention wall 11a is higher than the wrong operation prevention wall 11c.

In this manner, if the spring receiving portion 100 is formed at one end of the base portion 5a of the shutter 5, assembly of the spring 14 and the shutter 5 is facilitated. In this case, both sides of the one end of the base portion 5a thereof are extended downwardly in a frame-like manner to form a sliding engagement portion 5b which is engaged with two side grooves 500, 500 on the guide portion G.

In FIGS. 31 to 34, the upper and lower shell halves 1a, 1b are united by a plurality of fastening parts U, U, . . . U which are jointed by four screws 110. That is, a screw hole 111 is formed on the lower shell half 1b to receive the screw 110, and an accommodating recess 112 is formed at the head portion of the screw hole 111 in order to accommodate the head of the screw 110 without protruding of the head from the accommodating recess 112. A lower boss 113 is formed, at the periphery of the screw hole 111 in the lower shell half 1b, so as to be extended toward the upper shell half 1a. A portion of the upper shell half 1a, corresponding to the screw hole 111 is formed an upper boss portion 114 whose outer diameter is approximately equal to the inner diameter of the lower boss portion 113, so that the upper and lower boss portions are tightly engaged. The upper boss portion 114 is inserted into the lower boss portion 113, and the screw 110 is then inserted into a screw hole 115 through the screw hole 111 whereby the upper and lower shell halves 1a, 1b are tightly united by a simple operation.

Figure 35:
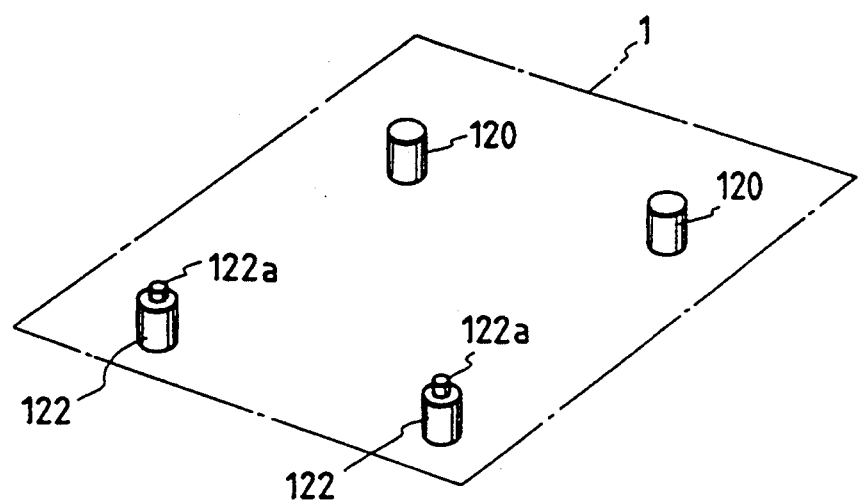
Figure 37:
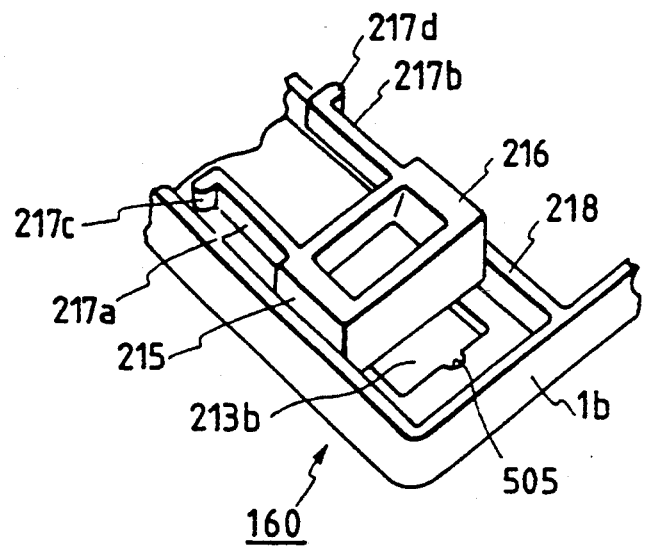
FIG. 37 is a perspective view of a writing protection mechanism on the side of the lower shell half.

When the disk cartridge is loaded into the player, the case 1 is, as shown in FIG. 35, supported, at a predetermined position therein, by four support pins 120, 120, . . . 122. One pair of support pins 120, 120 are in the form of a column and the other pair of support pins 122, 122 have two pins 122a, 122a on the upper surface of two columar bodies, respectively. That is, the case 1 is supported on four support pins with the lower shell half 1b contacting the support pins 120, and the head of each support pin 120 abuts against a support place 123 located near the periphery of the case 1.

The accommodating recesses 112 must be formed on the periphery of the lower shell half 1b, and the support places 123 must be also formed on the periphery of the lower shell half 1b. Therefore, there may be a fear that the recesses 112 and the support places 123 falls on each other. However, in this embodiment, there is no fear that the accommodating recesses 112 falls on the support places 123 because the support places 123 are formed sufficiently remotely from the recesses 112 not only on the upper side of the lower shell half 1b, but also on the lower side thereof. Therefore, especially the heads of the support pins on the upper side of the case is not inserted into the accommodating recess 112. Accordingly, the head of each support pin reliably abuts against each support place 123 thereby to support the cartridge at a predetermined position in the player.

Figure 31:
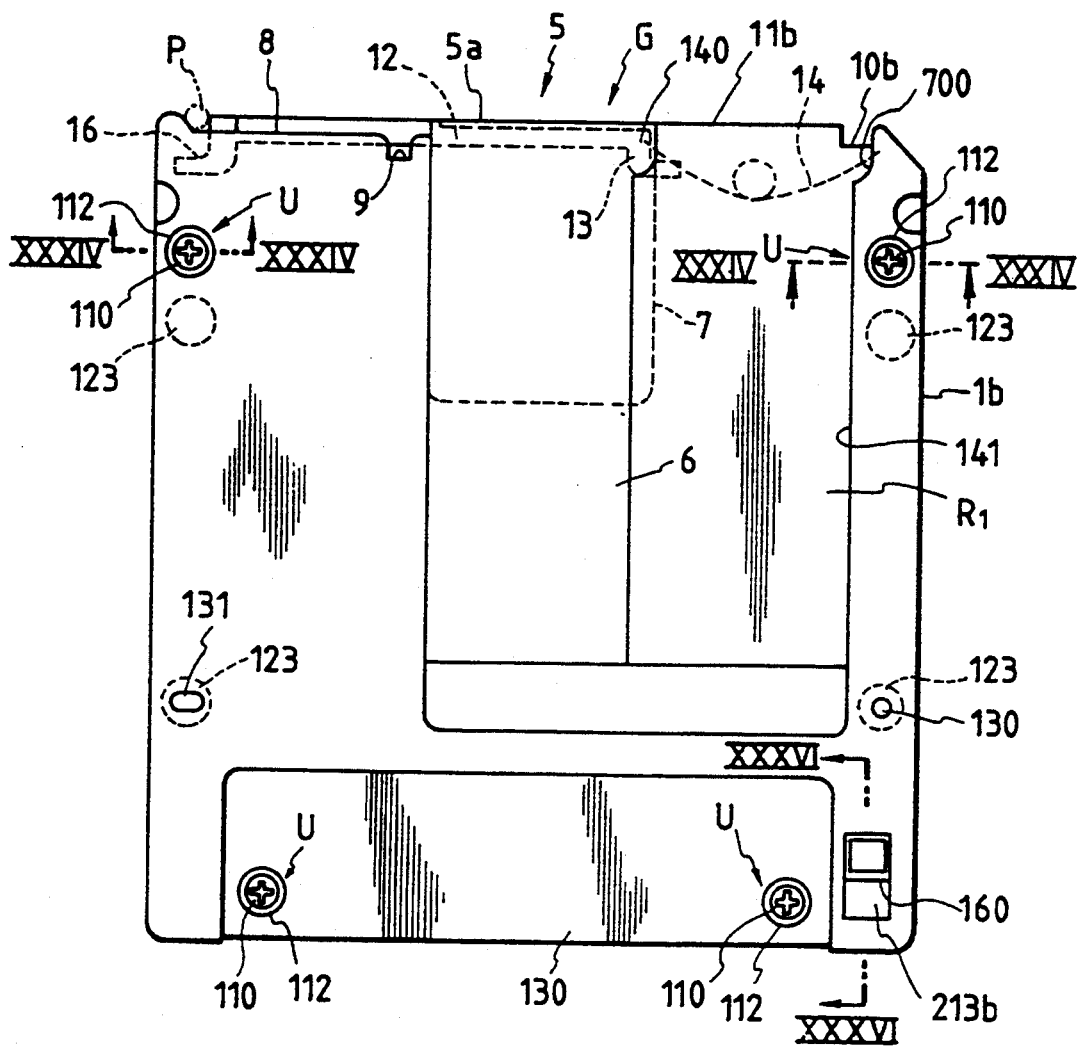
FIG. 31 is a plan view of the lower shell half of the disk cartridge.

As shown in FIG. 31, the case 1 has a pair of locating openings 130, 131 on the both widthwise side of the case 1 in the two support places 123 for receiving the locating pins 122a, 122a (FIG. 25). The right locating opening has a circular shape while the left locating opening 131 has an elliptic shape to receive the pin 122a loosely. Therefore, even if the distance between the two locating openings 130, 131 is slightly different from a standard value, the pins 122a can be smoothly inserted into the locating openings 130, 131. Each support place 123 is formed flatly because it functions as a reference plane when the disk cartridge is loaded into the player.

On the lower side of the lower shell half 1b is formed a label attaching shallow recess 130 which is slightly recessed from the surface of the lower shell half 1b (FIG. 31).

The main closing plate 6 of the shutter 5 is slightly smaller in width than the supplementary closing plate 7 and has a projection 140 at its upper right corner. This is because a stopping wall 141 defining the shallow recess $R_1$ must be separated sufficiently from the outer side periphery of the case to form a sufficiently large support place 123. That is, it is desirably that the width of the base portion 5a of the shutter 5 is large in view of a stable sliding movement. To this end, the upper portion of the main closing plate 6 has the same width as that of the supplementary closing plate 7, and the width of the main closing portion 6 is slightly narrow in comparison with that of the supplementary closing plate to ensure a sufficiently large support place 123. The stopping wall 141 has, at its upper corner, a cut away portion 700 for engaging with the projection 140 of the supplementary closing plate 7.

On the right and lower side of the case 1 is provided a writing projection mechanism 160 for preventing new information from being recorded on old information, that is, the writing protection mechanism 160 has a first and second passing holes 213a, 213b through which a light beam emitted from a light emitting element passes to operate a light receiving element. The light beam is shielded by a closing piece 215 (FIGS. 36 to 39).

The closing piece 215 has a main body 216 and two engaging legs 217a, 217b extended from the opposite sides of the main body 216. The engaging legs 217a, 217b have, at their ends, two projected portions 217c, 217d, respectively. The closing piece 215 is slidably accommodated in an accommodating wall 218. The accommodating wall 218 on the lower shell half side has, at its inner surface, two stopping projections 218a, 218b to engage with the engaging legs 217a, 217b. When the projected portions 217c, 217d of the engaging legs 217a, 217b are engaged with the upper sides of the stopping projections 218a, 218b, the main body 216 is held to close the first and second passing holes 213a, 213b. When the closing piece 215 is moved downwardly from a position shown in FIG. 28, the projection portions 217c, 217d of the engaging legs 217a, 217b is engaged with the lower sides of the engaging projections 218a, 218b, resulting in that the main body 216 opens the first and second passing holes 213a, 213b to be held at its opening position. On the opposite sides of the passing hole 213b on the lower shell half 1b is formed two insertion grooves 505, 505 into which a pin is inserted to move the closing piece 215.

There may be a case that the upper and lower shell halves 1a, 1b are assembled with a small space t therebetween by mistake. In addition, when the disk cartridge is dropped, there may occur the space t. In this case, the small space t does not influence the sliding movement of the closing piece 215 because of sufficient thickness of the closing piece 215.

Figure 36:
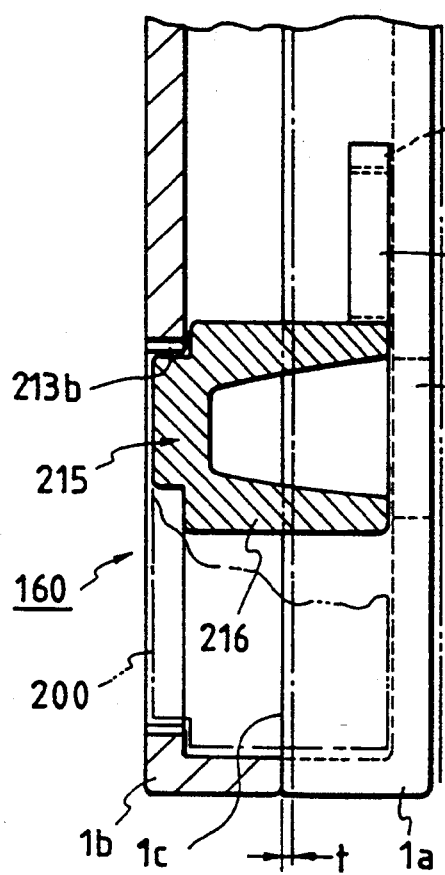
FIG. 36 is a sectional view taken along the line XXXVI—XXXVI shown in FIG. 31.
Figure 38:
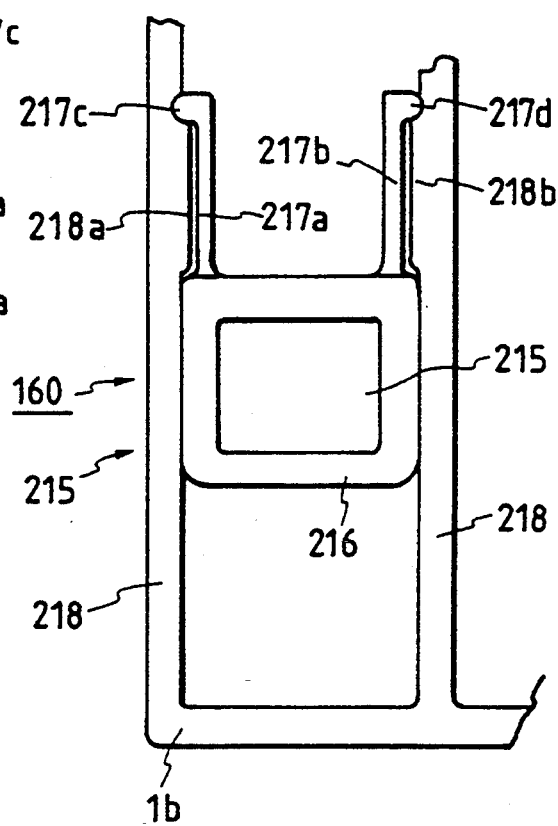
FIG. 38 is a plan view of the writing protection mechanism.
Figure 39:
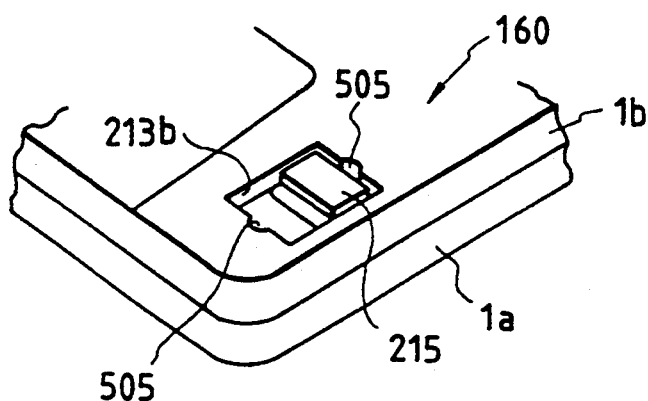
FIG. 39 is a perspective view of the writing protection mechanism as viewed from the lower shell half.
Figure 40:
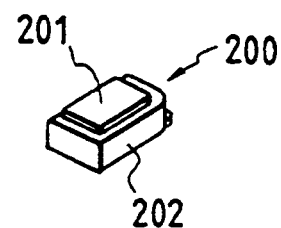
FIG. 40 is a perspective view of a block used for the writing protection mechanism.

In the case of a disk cartridge for accommodating a Hi-ROM disk, etc., since such a writing protection mechanism is not necessary, a block 200 is used as shown in FIG. 40. The block 200 has a projecting table 201 on a base 202. The projecting table 201 is inserted into the passing hole 213b formed in the lower shell half 1b and the base 202 is accommodated in a accommodating spaced defined by the surronding walls 218. The passing hole 213a on the upper shell half 1a is always closed. The accommodated state of the block 200 in the mechanism 16 is indicated by an imaginary line as shown in FIG. 36.

Figure 32:
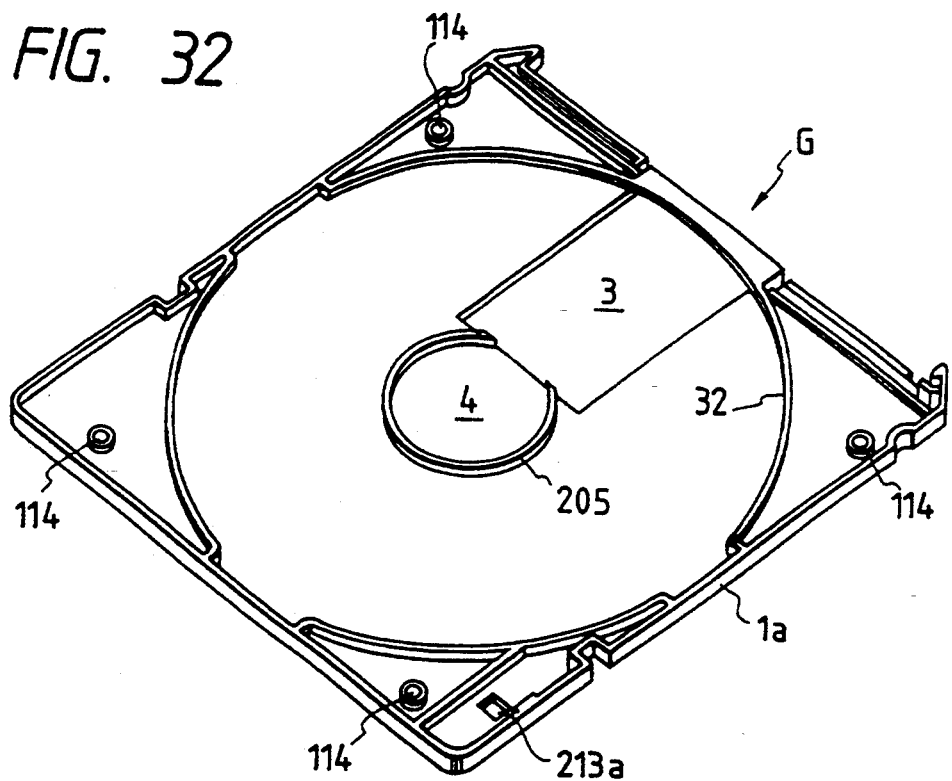
FIG. 32 is a perspective view of the inner surface of the upper shell half of the disk cartridge.
Figure 33:
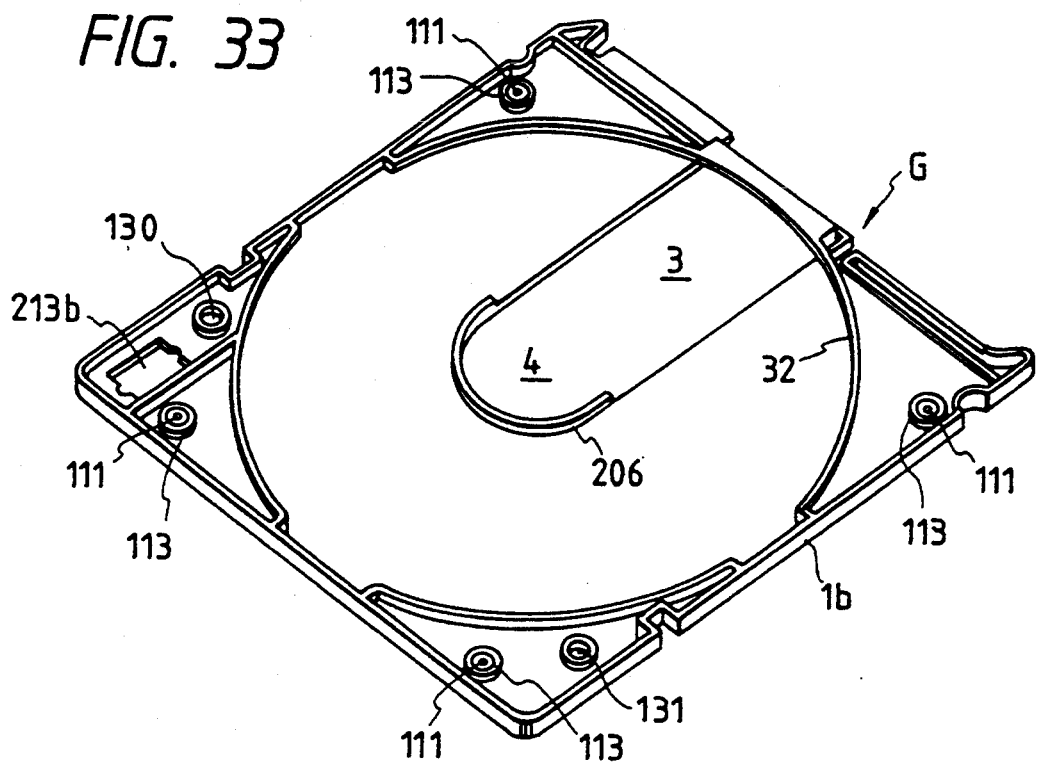
FIG. 33 is a perspective view of the inner surface of the lower shell half of the disk cartridge.
Figure 34:
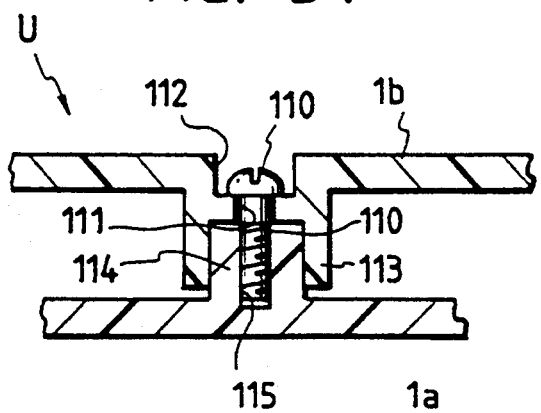
FIG. 34 is a sectional view taken along the line XXXIV—XXXIV shown in FIG. 31.

As shown in FIGS. 32 and 33, at the periphery of the spindle hole 4 of each shell half are provided two annular projections 205, 206 which are coated with a slippery material to prevent a wear between the disk and the case.

Figure 41:
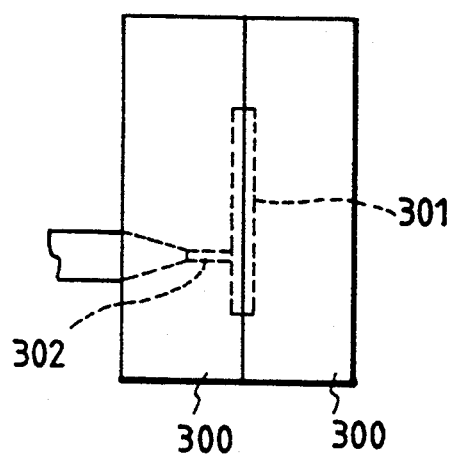
FIG. 41 is a diagrammatic view of a metal mold for manufacturing each shell half.

Each of shell halves 1a, 1b is formed by a mold through an injection molding method, and the mold is, as shown in FIG. 41, formed by two divided molds 300, 300. Injection material is injected into a cavity 301 through a single injection hole 302. Fox example, in the case of the lower shell half 1b, the injection hole 302 is opposed to a position covered with the retaining plate 40 for retaining the distal end of the main closing plate 6 (FIG. 2). If an injection molding is performed through a plurality of injection holes, a wave-like pattern which is called a weld mark is formed at a joint place of materials supplied from different injection holes. However, if an injection molding is performed through the single injection hole 302 in this embodiment, a weld mark does not occur.

Figure 42:
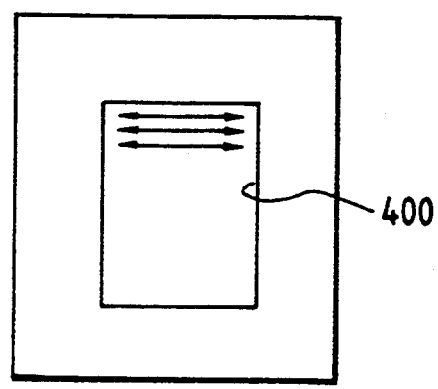
FIG. 42 is a plan view of a cavity in the metal mold.

As shown in FIG. 42, a cavity forming surface of each shell half, corresponding to the guide portion G of the case is polished in the sliding direction of the slider 12, that is, in the left and right direction as viewed in FIG. 42, to form a smooth surface for the slider 12.

Figure 43:
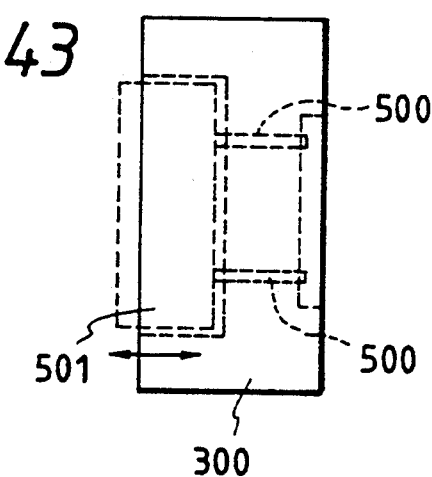
FIG. 43 is a diagrammatic view of another metal mold for manufacturing each shell half.

At last, as shown in FIG. 43, a mold 300 is provided with a pin injection adjusting mechanism for adjusting length of projection of a plurality of injection pins 500, 500 ... 500. The mechanism comprises a base 501 whose movement in the left and right direction can be adjusted. The length of projection of the pins 500 is adjusted so as not to form a trace of the injection pin 500 on the each shell half after its injection molding.

What is claimed is:

1. A structure of a slider for supporting a shutter provided slidably on a case for accommodating a disk to open and close a head hole for receiving a reading/writing head and a spindle hole for receiving a spindle hole for rotating the disk, the shutter being urged by a spring member in its closing direction, the slider being slid in a guide portion provided on a front end of the case, which comprises:
    a shutter support portion for supporting the shutter; and
    a pair of engaging projection bodies respectively provided at front and rear portions of the shutter support portion, the engaging projection bodies being pushed into the guide portion, each engaging projection being provided with a dividing groove to permit each engaging projection to shrink in its widthwise direction thereby to enable the slider to be pushed into the guide portion.

2. A structure of the slider according to claim 1, wherein the slider has an extended portion extended from a front end of the shutter support portion, the engaging projection bodies comprising a first engaging projection body provided on a rear end of the shutter support portion, and a second engaging projection body provided at front end of the extended portion, the guide portion having guide rails projected inwardly of the case, each engaging projection body passing over the guide rails deeply into the guide protion.

3. A structure of the slider according to claim 1, wherein the slider is made of synthetic resin such as polyacetal to give an elasticity to the slider.

4. A structure of the slider according to claim 1, wherein the slider holds a shutter which has two closing plates coming close to each other.

5. A structure of the slider according to claim 1, wherein the first engaging projection body has a pair of projection formed at a bottom face of the rear portion of the shutter support portion so as to be extended rearwardly to be respectively engaged with a pair of guide grooves formed on inner walls of the guide portion, the guide grooves being formed on the inner walls of the guide portion more inwardly than the guide rails so that the first engaging projection body is engaged with the guide grooves passing over the guide rails, the diving groove being formed between the pair of projections so as to also function to receive one arm of the spring member, the second engaging projection body having a pair of wings projection in lateral direction of the extended portion to contact a guide surface formed at the front edge of the case, and a guide foot suspended from the front end of the extended portion so as to be extended forwardly more than the front edge of the extended portion, the guide foot being divided by the dividing groove so as to be elastically deformed.

6. A structure of the slider according to claim 5, wherein the pair of projections of the first engaging projection body and the guide foot have inclined surfaces, respectively, to facilitate each engaging projection body to pass over the guide rails deeply into the guide portion.

7. A structure of the slider according to claim 5, wherein one of the pair of projections of the first engaging projection body for engaging with the guide grooves is formed shorter than the other one.

8. A structure of the slider according to claim 5, wherein the dividing groove functions as a groove for receiving one arm of the spring member, a projection being formed at a deep position of the dividing groove for preventing the one arm from coming out therefrom, an opening being formed for receiving a bent distal end of the one arm of the spring member.

9. A structure of the slider according to claim 5, wherein the guide foot is formed that its upper surface is located under a bottom wall of a dropping recess into which a drive pin is dropped when the shutter takes its opening position, a rear end portion of its lower surface being cut away to prevent its contact with a surrounding wall formed in the case for holding a periphery of the disk accommodated therein.

* * * * *

UNITED STATES PATENT AND TRADEMARK OFFICE
CERTIFICATE OF CORRECTION

PATENT NO. : 5,381,293
DATED : January 10, 1995
INVENTOR(S) : Akiyama et al

It is certified that error appears in the above—identified patent and that said Letters Patent is hereby corrected as shown below:

Title page, item [62], after reference to Patent No. 5,325,257, insert

--which is a continuation of Serial No. 654,897,
      February 13, 1991, abandoned.--

Signed and Sealed this

Thirteenth Day of June, 1995

Attest:

BRUCE LEHMAN

Attesting Officer      Commissioner of Patents and Trademarks